United States Patent
Tanaka et al.

[11] Patent Number: 6,053,653
[45] Date of Patent: Apr. 25, 2000

[54] FASTENING METHOD, FASTENING SYSTEM AND BOLT USED THEREFOR

[75] Inventors: Shigehumi Tanaka; Hideki Muramatsu; Shigehisa Becchaku, all of Yokohama, Japan

[73] Assignee: Sannohashi Corporation, Tokyo, Japan

[21] Appl. No.: 09/038,810

[22] Filed: Mar. 11, 1998

[30] Foreign Application Priority Data

May 9, 1997 [JP] Japan .................................. 9-136184

[51] Int. Cl.$^7$ .................................................. F16B 33/00
[52] U.S. Cl. ...................... 403/282; 403/343; 403/408.1; 411/412; 411/413; 29/525.11
[58] Field of Search .................................. 403/282, 274, 403/343, 408.1; 411/263, 412, 413, 386; 29/525.11

[56] References Cited

U.S. PATENT DOCUMENTS

| | | | |
|---|---|---|---|
| 4,396,309 | 8/1983 | McCormick | 403/408 |
| 4,621,963 | 11/1986 | Reinwall | 411/412 X |
| 4,653,244 | 3/1987 | Farrel | 411/413 X |
| 5,380,118 | 1/1995 | Stahlecker et al. | 403/343 |

FOREIGN PATENT DOCUMENTS

| | | | |
|---|---|---|---|
| 213464 | 3/1958 | Australia | 411/413 |
| 1 304 784 | 1/1973 | United Kingdom . | |
| 1 449 307 | 9/1976 | United Kingdom . | |

*Primary Examiner*—Robert H Games
*Assistant Examiner*—John R. Cottingham
*Attorney, Agent, or Firm*—Karl Bozicevic; Bozicevic, Field & Francis LLP

[57] ABSTRACT

The present invention provides a fastening method for fastening a first member to a second member by a bolt, comprising the steps of: inserting the bolt through a hole in the first member into a hole in the second member to start threadably engaging the bolt in a threaded hole provided in the second member; then, in a subsequent threadably engaging process, shaping, for example by plastically deforming or cutting, the holes of both the first and second members by a large-diameter portion provided around a bolt shank and having a diameter larger than that of the holes. The invention also provides a fastening system and a bolt used for the above-described method. With this method, it is possible to accurately connect the first and second members by the bolt, and to miniaturize the parts without increasing costs or lowering productivity.

12 Claims, 4 Drawing Sheets

FASTENING METHOD, FASTENING SYSTEM AND BOLT USED THEREFOR

CROSS-REFERENCE TO RELATED APPLICATIONS

This application claims priority under 35 U.S.C. § 119 to Japanese application 9-136184 filed May 9, 1997.

BACKGROUND OF THE INVENTION

1. Field of the Invention

The present invention relates to a fastening method, a fastening system, and a bolt used therefor.

2. Description of the Related Art

In manufacturing an automobile, after a bracket is assembled to an engine body and is formed with a camshaft hole, the bracket is detached and a camshaft is mounted and then, the bracket is again assembled and the camshaft is interposed between the bracket and the engine body. The bracket and the engine body are fastened by a bolt.

In the case of a crankshaft, a lower end of a connecting rod is divided into two, and the crankshaft is sandwiched between the two divided portions and the two divided portions are fastened by a bolt and are mounted.

When two members, such as the engine body and the bracket or the two divided portions of the connecting rod, are fastened by a bolt as described above, a method shown in FIG. 8 is conventionally used. FIG. 8 shows a case in which to-be-fastened members a and b are fastened by a bolt c. A problem which is caused during a fastening operation is that it is necessary to secure a clearance for inserting the bolt between an outer peripheral surface of a shank of the bolt c and an inner peripheral surface of an insertion hole e of the to-be-fastened member a and, therefore, the insertion hole e of member a and a threaded hole f of member b are brought into misalignment during fastening and a predetermined connection accuracy can not be obtained. Therefore, in the case of the camshaft and the like, this misalignment causes friction and/or noise.

Thereupon, in the conventional method, a pressure ring g is fitted into an annular groove h formed around the threaded hole f of member b, and an annular groove i formed around the insertion hole e of member a is press-fitted over the pressure ring g, thereby providing an accurate connection between a and b.

However, mounting the pressure ring g, which is an additional part, and forming the grooves h and i complicate the manufacturing process and the structure, which increases costs and lowers productivity. Further, it is necessary to provide a space for mounting the pressure ring g, which makes it difficult to reduce the size of the parts.

SUMMARY OF THE INVENTION

The present invention solves the above problems, and it is an object of the invention to provide a fastening method, along with a fastening system and a bolt used therefor, in which two members secured by the bolt are accurately connected, costs are not increased, productivity is not lowered, and the parts can be reduced in size.

To achieve the above object, in a first aspect of the invention there is provided a fastening method for fastening a first member to a second member by a bolt, comprising the steps of: inserting the bolt into holes continuously formed in both the first and second members to start threadably engaging the bolt in a threaded hole provided in the second member; then, in a subsequent threadably engaging process, shaping, for example by plastically deforming or cutting, the holes of both the first and second members by a large-diameter portion which is provided around a shank of the bolt and which has a diameter larger than that of the holes.

According to a second aspect of the invention, there is provided a fastening method for fastening first and second members by a bolt, comprising the steps of: inserting the bolt through the first member into the second member from the side of a large-diameter hole in the first member so that connection surfaces of the first and second members are placed next to each other; starting threadably engaging a small-diameter screw on the bolt in a threaded hole in the second member; and then, in a subsequent threadably engaging process, shaping, for example by plastically deforming or cutting, first and second small-diameter holes in the first and second members by a large-diameter screw on the bolt; wherein said first member comprises the large-diameter hole passing from a first end, which is a seating surface of a bolt head, to a region partway to a second end, which is a connection surface with the second member, and further comprises the first small-diameter hole which is concentric with the large-diameter hole and passes through the first member to the second end; wherein said second member comprises the second small-diameter hole, passing from the connection surface with the first member to a concentric threaded hole in that order, wherein said second small-diameter hole has a diameter equal to that of the first small-diameter hole; wherein the diameters of the first and second small-diameter holes are smaller than the diameter of the large-diameter hole, and wherein the diameter of the threaded hole is smaller than those of the first and second small-diameter holes; wherein the bolt comprises a bolt head, a shank, the large-diameter screw and the small-diameter screw in that order in an axial direction of the bolt; wherein the diameter of the shank is smaller than the diameter of the large-diameter hole; wherein the diameter of the large-diameter screw is smaller than the diameter of the large-diameter hole and larger than the diameters of the first and second small-diameter holes; and wherein an axial length from a tip end of the small-diameter screw to a tip end of the large-diameter screw is longer than a length from an end of the first small-diameter hole at the side of the large-diameter hole to a base end of the threaded hole.

According to a third aspect of the invention, there is provided a bolt used for a fastening method as set forth in the second aspect of the invention, wherein the bolt is formed with a bolt head, a shank, a large-diameter screw and a small-diameter screw, which is to be threadably engaged in a threaded hole, in that order in an axial direction of the bolt, the diameter of the shank being smaller than the diameter of the large-diameter hole, the diameter of the large-diameter screw being smaller than the diameter of the large-diameter hole and larger than those of the first and second small-diameter holes, and an axial length from a tip end of the small-diameter screw to a tip end of the large-diameter screw being formed longer than a length from an end of the first small-diameter hole at the side of the large-diameter hole to a base end of the threaded hole. In a fourth aspect, the bolt additionally comprises a notch in the large-diameter screw for tapping the small-diameter holes. In a fifth aspect, a bolt according to the third or fourth aspects of the invention is provided wherein the large-diameter screw and the small-diameter screw are formed such that their starting positions of screw thread cutting are set equal to each other.

According to a sixth aspect of the invention, there is provided a fastening method for fastening first and second members by a bolt, comprising the steps of: inserting the bolt through the first member into the second member from the side of a large-diameter hole in the first member so that connection surfaces of both the first and second members are placed next to each other; starting threadably engaging a small-diameter screw on the bolt in a threaded hole in the second member; and then, in a subsequent threadably engaging process, shaping, for example by plastically deforming or cutting, an intermediate-diameter hole in the first member by a large-diameter screw on the bolt; and shaping, for example by plastically deforming or cutting, a small-diameter hole in the second member by an intermediate-diameter screw on the bolt; wherein said first member comprises a large-diameter hole passing from a first end, which is a seating surface of a bolt head, to a region partway to a second end, which is a connection surface with the second member, and further comprises an intermediate-diameter hole which is concentric with the large-diameter hole and passes through the first member to the second end; wherein said second member comprises a small-diameter hole, passing from the connection surface with the first member to a concentric threaded hole; wherein the diameter of the intermediate-diameter hole is smaller than the diameter of the large-diameter hole; wherein the diameter of the small-diameter hole is smaller than the diameter of the intermediate-diameter hole; wherein the diameter of the threaded hole is smaller than the diameter of the small-diameter hole; wherein the bolt comprises a bolt head, a shank, the large-diameter screw, the intermediate-diameter screw and the small-diameter screw, which is to be threadably engaged in the threaded hole, in that order in an axial direction of the bolt; wherein the diameter of the shank is smaller than the diameter of the large-diameter hole; wherein the diameter of the large-diameter screw is smaller than the diameter of the large-diameter hole and larger than that of the intermediate-diameter hole; wherein the diameter of the intermediate-diameter screw is smaller than the diameter of the intermediate-diameter hole and larger than the diameter of the small-diameter hole; wherein a first axial length from a tip end of the small-diameter screw to a tip end of the intermediate-diameter screw is longer than a length from an end surface of the small-diameter hole at the side of the first member to a base end of the threaded hole; wherein a second axial length from a tip end of the small-diameter screw to a tip end of the large-diameter screw is longer than a length from an end surface of the intermediate-diameter hole at the side of the large-diameter hole to the base end of the threaded hole.

In a seventh aspect of the invention, a fastening method according to the second or sixth aspects is provided wherein the plastic shaping of the small-diameter hole is conducted by a half-tapping.

According to an eighth aspect of the invention, there is provided a bolt used for a fastening method as set forth in the sixth aspect of the invention, wherein the bolt is formed with a bolt head, a shank, a large-diameter screw, an intermediate-diameter screw and a small-diameter screw, which is to be threadably engaged in a threaded hole, in that order in an axial direction of the bolt; wherein the diameter of the shank is smaller than the diameter of the large-diameter hole, the diameter of the large-diameter screw is smaller than the diameter of the large-diameter hole and larger than those of the intermediate-diameter hole, the diameter of the intermediate-diameter screw is smaller than the diameter of the intermediate-diameter hole and larger than the diameter of the small-diameter hole, and an axial length from a tip end of the small-diameter screw to a tip end of the intermediate-diameter screw is formed longer than a length from an end surface of the first small-diameter hole a the side of the first member to a base end of the threaded hole; an axial length from a tip end of the small-diameter screw to a tip end of the large-diameter screw is formed longer than a length from an end surface of the intermediate-diameter hole at the side of the large-diameter hole to the base end of the threaded hole. In a ninth aspect of the invention, the bolt additionally comprises a notch in each of the large-diameter screw and the intermediate-diameter screw for tapping. In a tenth aspect of the invention, a bolt according to the eighth or ninth aspects of the invention is provided wherein the large-diameter screw, the intermediate-diameter screw and the small-diameter screw are formed such that their starting position of screw thread cutting are set equal to each other.

According to an eleventh aspect of the invention, there is provided a fastening method for fastening first and second members by a bolt, comprising the steps of: inserting the bolt through the first member into the second member from the side of a first press-fit hole in the first member so that connection surfaces of the first and second members are placed next to each other; starting threadably engaging the threaded portion of the bolt in a threaded hole in the second member; and then, in a subsequent threadably engaging process, press-fitting a shank of the bolt into first and second press-fit holes to plastically deform the first and second press-fit holes; wherein the first member comprises a first press-fit hole passing from a first end, which is a seating surface of a bolt head, to a second end, which is a connection surface with the second member; wherein the second member comprises a second press-fit hole passing from the side of the connection surface with the first member to a concentric threaded hole in that order, wherein the second press-fit hole has a diameter equal to that of the first press-fit hole, wherein the threaded hole has a diameter smaller than those of the first and second press-fit holes; wherein the bolt comprises the bolt head, a shank and the threaded portion, which is to be threadably engaged in the threaded hole, in that order in an axial direction of the bolt; wherein the diameter of the shank is larger than those of the first and second press-fit holes, wherein an axial length from a tip end of the threaded portion to a tip end of the shank is longer than a length from an end of the first press-fit hole at the side of the seating surface of the first member to a base end of the threaded hole.

In further aspects of the invention, fastening systems useful in the methods set forth in the first, second, sixth and eleventh aspects are provided, comprising the bolt and first and second members described above.

According to the present invention, the following effects can be obtained.

(A) The screw provided at the tip end of the bolt is first threadably engaged in the threaded hole of the second member, and after an accurate fastening position of the bolt is secured, the inner peripheral surfaces of the holes in the first and second members are plastically deformed or cut, thereby fastening the bolt. Therefore, centers of axes of the bolt insertion holes of the two first and second members do not deviate or misalign, and an accurate connection can be secured.

(B) It is unnecessary to form an annular groove and to use a separate pressure ring as in the prior art and therefore, it is possible to lower costs, to enhance productivity, to reduce the number of parts, and to miniaturize the parts.

(C) The first to-be-fastened member is shaped by a plastic deformation or cutting so as to achieve alignment with the bolt and therefore, if the starting positions of the threads of the small-diameter screw, the intermediate-diameter screw and the large-diameter screw of the bolt are matched with each other, even if a new bolt is used for refastening the two first and second members, an accurate connection can be secured.

(D) By providing a small-diameter screw, an intermediate-diameter screw and a large-diameter screw of the bolt in a three-stage manner, a longer threading length between the bolt and one of the first and second members having no threaded hole can be secured without increasing the axial length of the small-diameter screw and thus, the fastening force can further be enhanced, as compared with a case in which only a small-diameter screw and a large-diameter screw are provided in a two-stage manner.

(E) By first conducting a plastic deformation by half-tapping, the to-be-fastened member can be worked using a small force for the shaping.

(F) When the shank of the bolt is to be press-fitted into press-fit hole(s) of the to-be-fastened member(s), it is unnecessary to form an intermediate-diameter screw or a large-diameter screw on the shank of the bolt, and it is possible to lower costs.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described with reference to the accompanying drawings. It is to be understood that, while the invention is described in conjunction with the preferred specific embodiments thereof, the description above as well as the examples which follow are intended to illustrate and not limit the scope of the invention. Other aspects, advantages and modifications within the scope of the invention will be apparent to those skilled in the art to which the invention pertains.

(First Embodiment)

A first embodiment will be described with reference to FIGS. 1 to 3.

(A) Shapes of the to-be-fastened Members.

Figure 2:
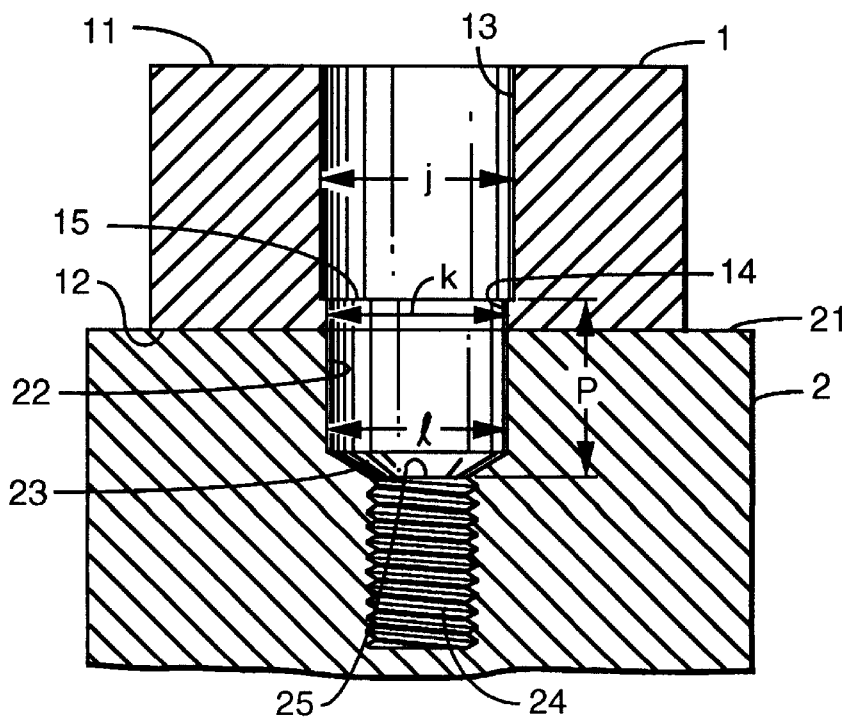
FIG. 2 is a cross-sectional view of first and second members comprising holes useful in a method for joining the members as set forth in a first embodiment of the invention.

As shown in FIG. 2, a large-diameter hole 13 is formed in a to-be-fastened member 1 (which corresponds to the first member described in claim 2) from a first end, which is a seat surface 11 of a bolt head, to a region partway to a second end of to-be-fastened member 1 which is a connection surface 12 to a to-be-fastened member 2 (which corresponds to a second member described in claim 2). A small-diameter hole 14, concentric with the large diameter hole, is formed to pass through the first to-be-fastened member.

On the other hand, the to-be-fastened member 2 is provided, from the side of a connection surface 21 with the second member, with a small-diameter hole 22 having the same diameter as the small-diameter hole 14, a tapered portion 23 having no thread, and a threaded hole 24 in that order. Diameters k and i of the small-diameter holes 14 and 22 are smaller than a diameter i of the large-diameter hole 13. The tapered portion 23 is gradually reduced in diameter and is continuously connected with the threaded hole 24. The tapered portion 23 may not be provided in some cases.

(B) Shape of the bolt.

Figure 3:
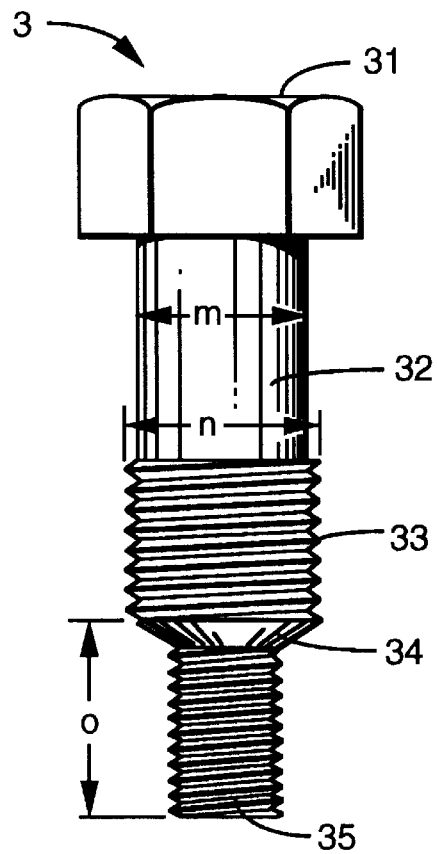
FIG. 3 is a cross-sectional view of a bolt useful for fastening a first member to a second member as set forth in a first embodiment of the invention.

As shown in FIG. 3, a bolt 3 is formed with a bolt head 31, a shank 32, a large-diameter screw 33, a tapered portion 34 having no thread, and a small-diameter screw 35 which is to be threadably engaged in the threaded hole 24, in that order in an axial direction of the bolt 3.

The diameter m of the shank 32 is smaller than the diameter of the large-diameter hole 13 of the to-be-fastened member 1. The diameter n of the large-diameter screw 33 is smaller than the diameter i of the large-diameter hole 13 and is larger than the diameters k and l of the small-diameter holes 14 and 22. The tapered portion 34 is gradually reduced in diameter and is continuously connected with the small-diameter screw 35. The tapered portion 34 may not be provided in some cases.

An axial length o from a tip end of the small-diameter-screw 35 to a tip end of the large-diameter screw 33 is formed longer than a length p from an end 15 of the small-diameter hole 14 at the side of the large-diameter hole 13 to a base portion 25 of the threaded hole 24. Pitches of these screws are formed equal to each other, and starting positions of screw thread cutting of the small-diameter screw 35 and the large-diameter screw 33 are set equal to each other, so that a fastening accuracy is secured when these elements are used again.

(C) Fastening Method.

Figure 1:
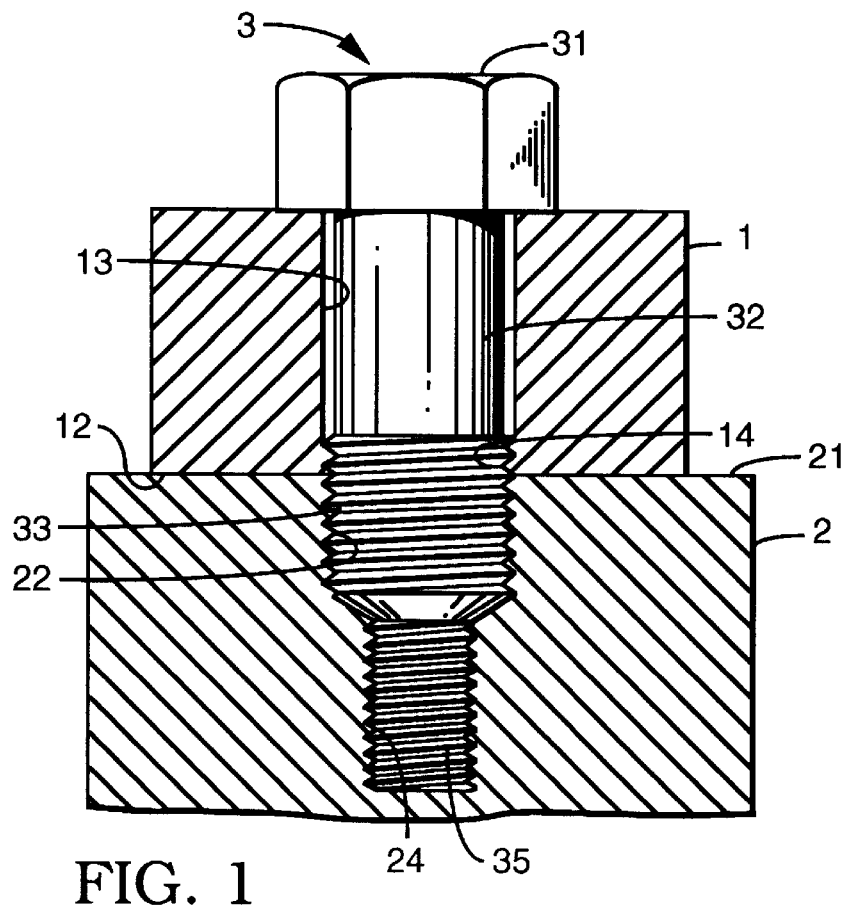
FIG. 1 is a cross-sectional view of a bolt fastening a first member to a second member as set forth in a first embodiment of the invention.

As shown in FIG. 1, so that the connection surfaces 12 and 21 of the first and second members 1 and 2 are placed on each other, the bolt 3 is inserted from the side of the large-diameter hole 13 and is rotated. Then, because the length o of the bolt 3 is longer than the length p of the first and second members 1 and 2, a tip end of the small-diameter screw 35 is first threadably engaged in the threaded hole 24, thereby securing an accurate fastening position of the bolt 3.

Next, inner peripheral surfaces of both the small-diameter holes 14 and 22 start being plastically deformed or cut by the large-diameter screw 33. If the bolt 3 is further rotated, it is possible to accurately fasten the first and second members 1 and 2 without generating any deviation in position.

When the first and second members 1 and 2 are made of nonferrous metals such as aluminum or copper, a tapping can be conducted using only the large-diameter screw 33. However, when the first and second members are made of ferrous metals, the tapping may be conducted by first providing a notch in the vicinity of the starting position of tapping by the large-diameter screw 33.

Further, because a fastening strength between the first and second members 1 and 2 is obtained by threading force between the small-diameter screw 35 and the threaded hole 24, a function required at the connection portion between the large-diameter screw 33 and the small-diameter holes 14 and 22 is only a positioning function and it is unnecessary to take the fastening strength into the consideration. Therefore, it is possible to half-tap the small-diameter holes 14 and 22 by the large-diameter screw 33. When half-tapping using the large-diameter screw 33 is to be performed, the small-diameter holes 14 and 22 are formed with larger diameters than if normal tapping were to be performed. More specifically, the diameters of the small-diameter holes 14 and 22 before external or male screws are formed are set in ranges, from a diameter between a crest diameter and a root diameter of the large-diameter screw 33 of the bolt 3, to the crest diameter. With this arrangement, when the large-diameter screw 33 is screwed to conduct the plastic deformation or cutting, the diameter of the lower portion of the external screw formed in each of the small-diameter holes 14 and 22 does not completely correspond to the root diameter of the large-diameter screw 33 of the bolt 3 but assumes a diameter in a range between the crest diameter and the root diameter and therefore, tapping can be conducted with a small tapping force.

(Second Embodiment)

A second embodiment will be described with reference to FIGS. 4 to 6 below.

(A) Shapes of the to-be-fastened Members.

Figure 4:
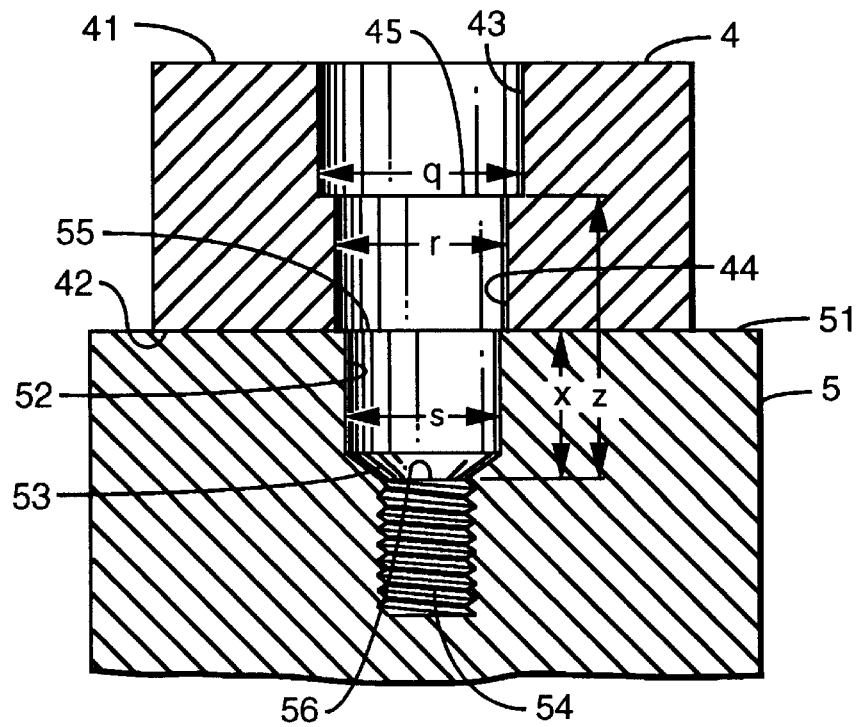
FIG. 4 is a cross-sectional view of first and second members comprising holes useful in a method for joining the members as set forth in a second embodiment of the invention.

As shown in FIG. 4, a large-diameter hole 43 is formed in a to-be-fastened member 4 (which corresponds to a first member described in claim 6) from a first end which is a seat surface 41 of a bolt head to a region partway to a second end of the to-be-fastened member 4 which is a connection surface 42 of a to-be-fastened member 5 (which corresponds to a second member described in claim 6). An intermediate-diameter hole 44 is formed in the to-be-fastened member 4 so as to pass through the latter.

On the other hand, the to-be-fastened member 5 is provided, from the side of a connection surface 51 with the to-be-fastened member 4, with a small-diameter hole 52, a tapered portion 53 having no thread, and a threaded hole 54 in that order. Diameters of these holes are set such that a diameter q of the large-diameter hole 43, a diameter r of the intermediate-diameter hole 44 and a diameter s of the small-diameter hole 52 are reduced in that order. The tapered portion 53 is gradually reduced in diameter and is continuously connected with the threaded hole 54. The tapered portion 53 may not be provided in some cases.

(B) Shape of the Bolt.

Figure 5:
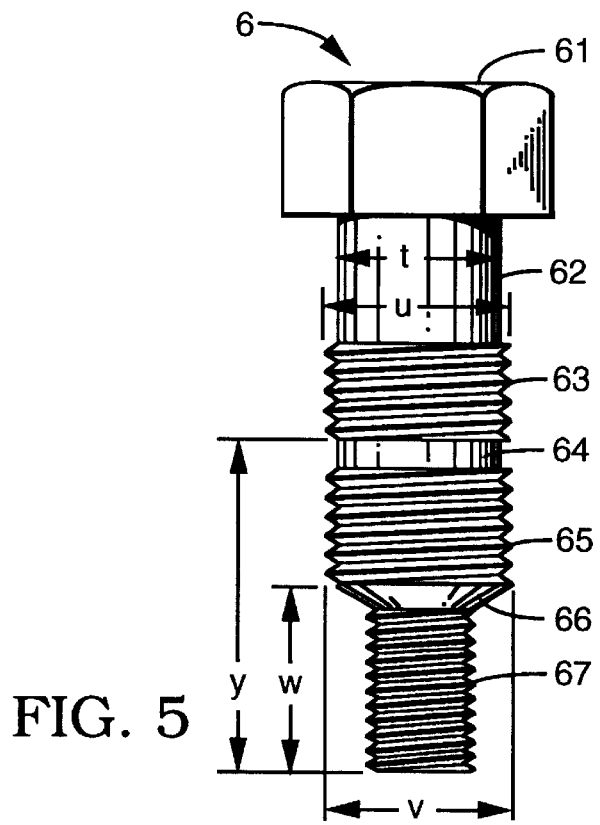
FIG. 5 is a cross-sectional view of a bolt useful for fastening a first member to a second member as set forth in a second embodiment of the invention.

As shown in FIG. 5, a bolt 9 is formed, in its axial direction, with a bolt head 61, a shank 62, a large-diameter screw 63, a non-threaded portion 64, an intermediate-diameter screw 65, a tapered portion 64 having no thread, and a small-diameter screw 67 which is to be threadably engaged in the threaded hole 54, in that order.

A diameter t of the shank 62 is smaller than the diameter q of the large-diameter hole 43 of the to-be-fastened member 4. A diameter u of the large-diameter screw 63 is smaller than the diameter q of the large-diameter hole 43 of the to-be-fastened member 4 and is larger than a diameter r of the intermediate-diameter hole 44. A diameter v of the intermediate-diameter screw 65 is smaller than the diameter r of the intermediate-diameter hole 44 of the to-be-fastened member 4 and is larger than a diameter of the small-diameter hole 52 of the to-be-fastened member 5. The tapered portion 66 is gradually reduced in diameter and is continuously connected with the small-diameter screw 67. The tapered portion 66 may not be provided in some cases. The diameter of the non-threaded portion 64 is equal to or smaller than a root diameter of the intermediate-diameter screw 65, but the non-threaded portion 64 may not be provided in some cases.

An axial length w from a tip end of the small-diameter-screw 67 to a tip end of the intermediate-diameter screw 65 is formed longer than a length x from an end 55 of the small-diameter hole 52 of the to-be-fastened member 5 at the side of the to-be-fastened member 4 to a base portion 56 of the threaded hole 54. An axial length y from a tip end of the small-diameter screw 67 to a tip end of the large-diameter screw 63 is formed longer than a length z from an end 45 of the intermediate-diameter hole 44 at the side of the large-diameter hole 43 to the base portion 56 of the threaded hole 54.

Pitches of these screws are formed equal to each other, and starting positions of screw thread cutting of these screws are set equal, so that these elements can be used again. A choice whether or not a notch should be provided or half-tapping should be applied may be determined in the same manner as in the first embodiment. The root diameters of the large-diameter screw 63 and the intermediate-diameter screw 65 should preferably be set equal to each other, and their crest diameters are preferably adjusted and formed by rolling.

(C) Fastening Method.

Figure 6:
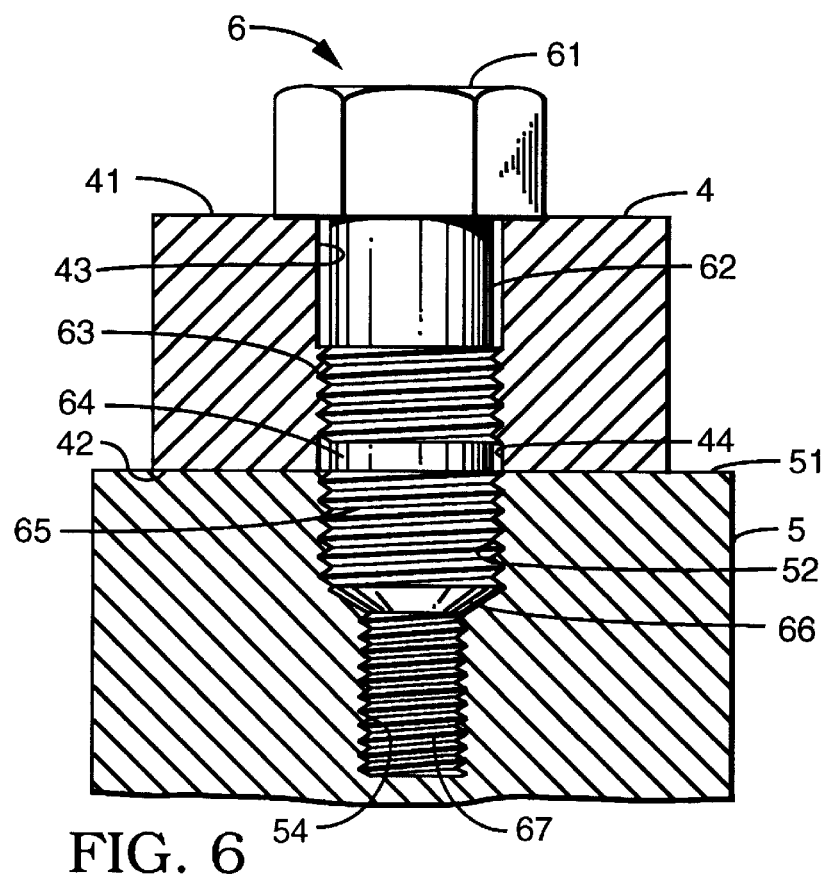
FIG. 6 is a cross-sectional view of a bolt fastening a first member to a second member as set forth in a second embodiment of the invention.

As shown in FIG. 6, in a state where the connection surfaces 42 and 51 of the first and second members 4 and 5 are placed on each other, the bolt 6 is inserted from the side of the large-diameter hole 43 and is rotated. Then, because the length w of the bolt 6 is longer than the length x of the to-be-fastened member 5, and the length y of the bolt 6 is longer than the length z of the first and second members 4 and 5, a tip end of the small-diameter screw 67 is first threadably engaged in the threaded hole 54, thereby securing an accurate fastening position of the bolt 6.

Next, a shaping, for example by plastic deformation or cutting, by tapping is started on an inner peripheral surface of intermediate-diameter hole 44 by the large-diameter screw 63, and a similar shaping by tapping is also started on an inner peripheral surface of the small-diameter hole 52 by the intermediate-diameter screw 65. If the bolt 6 is further rotated, it is possible to accurately fasten the first and second members 4 and 5 without generating any deviation in position. In the case of the present second embodiment, it is possible to increase the threading length between the to-be-fastened member 4 and the large-diameter screw 63 of the bolt 6 and thus, to further enhance the fastening force, as compared with the first embodiment.

(Third Embodiment)

Figure 7:
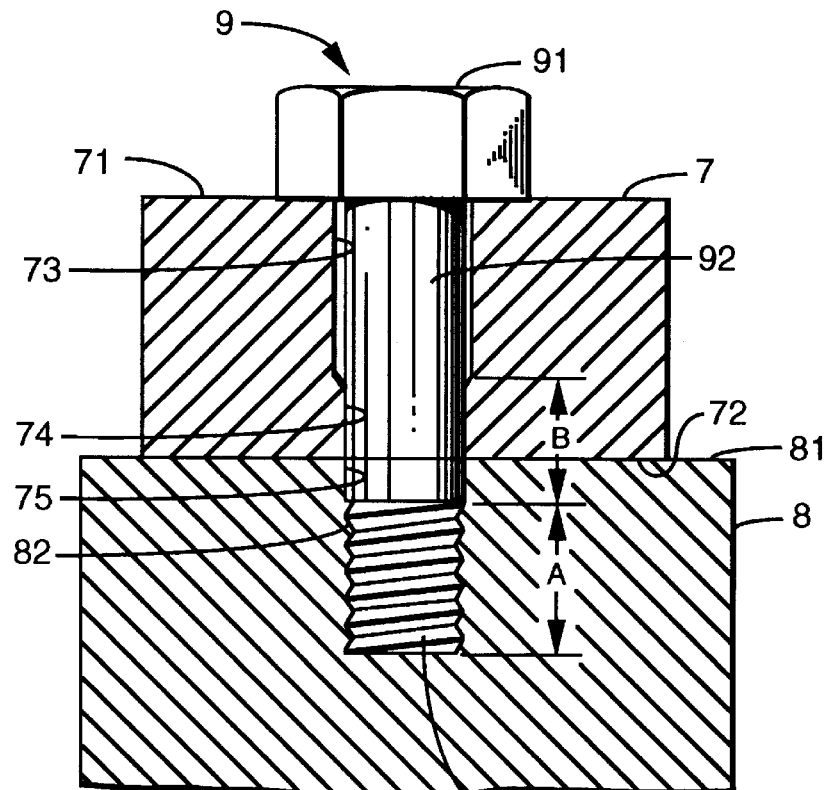
FIG. 7 is a cross-sectional view of a bolt fastening a first member to a second member as set forth in a third embodiment of the invention.
Figure 8:
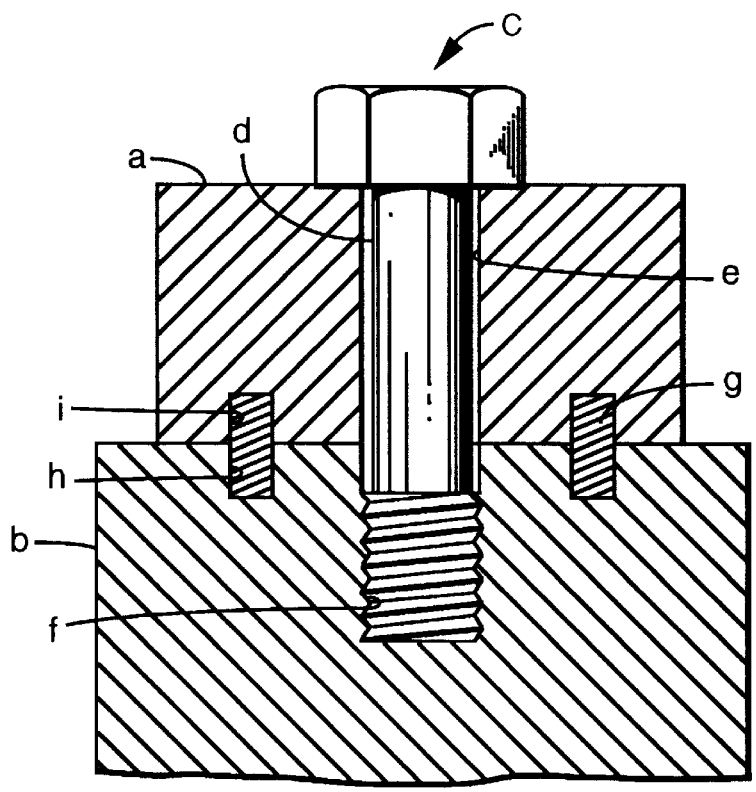
FIG. 8 is a cross-sectional view of the prior art method of using a bolt to fasten a first member to a second member.

A third embodiment will be described with reference to FIG. 7 below.

(A) Shapes of the to-be-fastened Members.

In a third embodiment, a to-be-fastened member 7 (which corresponds to a first member described in claim 11) is made of nonferrous metal(s) such as aluminum or copper. An insertion hole 73 is formed in a to-be-fastened member 7 from a first end, which is a seat surface 71 of a bolt head, to a region partway to a second end, which is a connection surface 72 to a to-be-fastened member 8 (which corresponds to a second member described in claim 11). press-fit hole 74 is formed in the to-be-fastened member 7 so as to pass through the latter.

When the to-be-fastened member 7 is relatively thin, the press-fit hole 74 may be formed without forming the insertion hole 73, and the press-fit hole 74 may be formed in any region between the seating surface and the connection surface. On the other hand, the to-befastened member 8 is provided with a press-fit hole 75, having the same diameter as that of the press-fit hole 74, and a small-diameter threaded hole 82, having a diameter smaller than that of the press-fit hole 75, in that order from a connection surface 81 to the to-be-fastened member 7.

(B) Shape of the Bolt.

A bolt 9 is formed with a bolt head 91, a shank 92 and a screw portion 93, which is to be threadably engaged in the threaded hole 82, in that order in an axial direction of the bolt 9. The diameter of the shank 92 is formed larger than diameters of the screw portion 93 and the press-fit holes 74 and 75 of the to-be-fastened member 7. An axial length A of the screw portion 93 is formed longer than an axial length B of the press-fit holes 74 and 75.

(C) Fastening Method.

When the connection surfaces 72 and 81 of the to-be-fastened members 7 and 8 are placed on each other, the bolt 9 is inserted from the side of the insertion hole 73 and is rotated. Then, because the length A of the screw portion 93 is longer than the length B of the press-fit holes 74 and 75, the screw portion 93 is first threadably engaged in the threaded hole 82, thereby securing an accurate fastening position of the bolt 9.

Next, if the shank 92 is press-fitted into the press-fit holes 74 and 75, and the bolt 9 is further rotated, it is possible to accurately fasten the to-be-fastened members 7 and 8 without generating a deviation in position. When the bolt 9 is to be detached, the bolt 9 is separated together with the to-be-fastened member 7 from the to-be-fastened member 8 and is detached. Therefore, even if members 7 and 8 are refastened, an accurate connection can be obtained. In this third embodiment, it is unnecessary to form an intermediate-diameter screw or a large-diameter screw and thus, it is possible to lower costs, as compared with the first and second embodiments.

What is claimed is:

1. A fastening method for fastening first and second members by a bolt, comprising the steps of:

inserting the bolt through the first member into the second member from the side of a large-diameter hole in the first member so that connection surfaces of the first and second members are placed next to each other;

starting threadably engaging a small-diameter screw on the bolt in a threaded hole in the second member; and then, in a subsequent threadably engaging process, shaping first and second small-diameter holes in the first and second members by a large-diameter screw on the bolt;

wherein said first member comprises the large-diameter hole passing from a first end, which is a seating surface of a bolt head, to a region partway to a second end, which is a connection surface with the second member, and further comprises the first small-diameter hole, which is concentric with the large-diameter hole and passes through the first member to the second end;

wherein said second member comprises the second small-diameter hole, passing from the connection surface with the first member and having a diameter equal to that of the first small-diameter hole, and a threaded hole in that order;

wherein the diameters of the first and second small-diameter holes are smaller than the diameter of the large-diameter hole, and wherein the diameter of the threaded hole is smaller than those of the first and second small-diameter holes;

wherein the bolt comprises a bolt head, a shank, the large-diameter screw and the small-diameter screw in that order in an axial direction of the bolt;

wherein the diameter of the shank is smaller than the diameter of the large-diameter hole;

wherein the diameter of the large-diameter screw is smaller than the diameter of the large-diameter hole and larger than the diameters of the first and second small-diameter holes; and wherein an axial length from a tip end of the small-diameter screw to a tip end of the large-diameter screw is longer than a length from an end of the first small-diameter hole at the side of the large-diameter hole to a base end of the threaded hole.

2. A bolt useful in the fastening method of claim 1, wherein said bolt is formed with the bolt head, the shank, the large-diameter screw and the small-diameter screw which is to be threadably engaged in said threaded hole in that order in an axial direction of said bolt, the diameter of said shank being smaller than the diameter of said large-diameter hole, the diameter of said large-diameter screw being smaller than the diameter of said large-diameter hole and larger than those of said small-diameter holes-a and b, and an axial length from a tip end of said small-diameter screw to a tip end of said large-diameter screw being formed longer than a length from an end of said first small-diameter hole at the side of said large-diameter hole to a base end of said threaded hole.

3. The bolt according to claim 2, wherein said large-diameter screw is formed with a notch for tapping.

4. The bolt according to claim 2, wherein said large-diameter screw and said small-diameter screw are formed such that their starting positions of screw thread cutting are set equal to each other.

5. The bolt according to claim 3, wherein said large-diameter screw and said small-diameter screw are formed such that their starting positions of screw thread cutting are set equal to each other.

6. The fastening method according to claim 1, wherein plastic shaping of said small-diameter hole is conducted by a half-tapping.

7. The fastening method according to claim 5, wherein plastic shaping of said small-diameter hole is conducted by a half-tapping.

8. A bolt used in a fastening method according to claim 5, comprising a bolt head, a shank, a large-diameter screw, an intermediate-diameter screw and a small-diameter screw, which is to be threadably engaged in the threaded hole, in that order in an axial direction of the bolt;

wherein the diameter of the shank is smaller than the diameter of the large-diameter hole; wherein the diameter of the large-diameter screw is smaller than the diameter of the large-diameter hole and larger than that of the intermediate-diameter hole;

wherein the diameter of the intermediate-diameter screw is smaller than the diameter of the intermediate-diameter hole and larger than the diameter of the small-diameter hole;

wherein a first axial length from a tip end of the small-diameter screw to a tip end of the intermediate-diameter screw is longer than a length from an end surface of the small-diameter hole at the side of the first member to a base end of the threaded hole;

wherein a second axial length from a tip end of the small-diameter screw to a tip end of the large-diameter screw is longer than a length from an end surface of the intermediate-diameter hole at the side of the large-diameter hole to the base end of the threaded hole.

9. The bolt according to claim 8, wherein each of said large-diameter screw and said intermediate-diameter screw is formed with a notch for tapping.

10. The bolt according to claim 8, wherein said large-diameter screw, said intermediate-diameter screw and said small-diameter screw are formed such that their starting position of screw thread cutting are set equal to each other.

11. The bolt according to claim 9, wherein said large-diameter screw, said intermediate-diameter screw and said small-diameter screw are formed such that their starting position of screw thread cutting are set equal to each other.

12. A fastening system for fastening first and second members comprising:

a first member comprising a large-diameter hole passing from a first end, which is a seating surface of a bolt head, to a region partway to a second end, which is a connection surface with the second member, and further comprises the first small-diameter hole, which is concentric with the large-diameter hole and passes through the first member to the second end;

a second member comprising a second small-diameter hole passing from a connection surface with the first member to a threaded hole in that order, wherein said second small-diameter hole has a diameter equal to that of the first small-diameter hole; and a bolt comprising a bolt head, a shank, a large-diameter screw and a small-diameter screw in that order in an axial direction of the bolt;

wherein the diameters of the first and second small-diameter holes are smaller than the diameter of the large-diameter hole, and wherein the diameter of the threaded hole is smaller than those of the first and second small-diameter holes;

wherein the diameter of the shank is smaller than the diameter of the large-diameter hole;

wherein the diameter of the large-diameter screw is smaller than the diameter of the large-diameter hole and larger than the diameters of the first and second small-diameter holes; and wherein an axial length from a tip end of the small-diameter screw to a tip end of the large-diameter screw is longer than a length from an end of the first small-diameter hole at the side of the large-diameter hole to a base end of the threaded hole.

* * * * *